United States Patent [19]

Keser et al.

[11] 4,199,674
[45] Apr. 22, 1980

[54] WELD HEAD CONTROL AND GUIDANCE SYSTEM

[75] Inventors: Paul D. Keser, Galesburg; Gerald E. McAlister, St. Augustine, both of Ill.

[73] Assignee: Butler Manufacturing Company, Kansas City, Mo.

[21] Appl. No.: 973,450

[22] Filed: Dec. 26, 1978

[51] Int. Cl.² .............................................. B23K 9/12
[52] U.S. Cl. ................................ 219/124.34; 318/653
[58] Field of Search .................... 219/124.22, 124.34; 318/653, 656; 336/130, 131

[56] References Cited

U.S. PATENT DOCUMENTS

| | | | |
|---|---|---|---|
| 2,747,152 | 5/1956 | Greene | 219/124.34 |
| 3,371,272 | 2/1968 | Stanton | 219/124.34 |
| 3,484,667 | 12/1969 | Wofsey | 219/124.34 |
| 3,594,540 | 7/1971 | Weinfurt | 219/124.34 |
| 3,833,788 | 9/1974 | Hovance et al. | 219/124.34 |

FOREIGN PATENT DOCUMENTS

| | | | |
|---|---|---|---|
| 39-12765 | 7/1964 | Japan | 219/124.34 |
| 228194 | 3/1969 | U.S.S.R. | 219/124.34 |

OTHER PUBLICATIONS

Industrial Devices Corp. Data Sheet for Model 15D Electric Cylinder.

Primary Examiner—Bruce A. Reynolds
Assistant Examiner—Clifford C. Shaw
Attorney, Agent, or Firm—Shoemaker and Mattare, Ltd.

[57] ABSTRACT

A weld head control and guidance system utilizing non-contact proximity sensors which generate a signal based on the electrical conductivity of a workpiece. The system includes electrical controls which receive the signal generated by the proximity sensors and control movement of a movable torch mount to maintain a welding torch in a proper orientation and position with respect to a workpiece.

4 Claims, 6 Drawing Figures

WELD HEAD CONTROL AND GUIDANCE SYSTEM

BACKGROUND OF THE INVENTION

The present invention relates in general to welding, and, more particularly, to devices for mounting a welding apparatus adjacent workpieces.

A connecting operation, such as welding or the like, is often used in the fabrication of many products, such as beams, or the like. Often, the welding operation is performed on workpieces which are being moved continuously past the welding station. Thus, a beam can be formed by welding a flange to a web as those elements move continuously past a welding torch.

A common manner of carrying out such a welding operation includes having the torch accurately positioned adjacent the location whereat the weld is to be placed, and precisely held in that position as the workpieces are moved thereby.

To effect a proper weld, the standoff distance, that is, the distance between the torch head and the weld point on the two surfaces to be welded together, must be precisely maintained. To accomplish this positioning, automatic tracking devices have been used.

Known tracking devices can be classified into two general groups. The first group includes those devices using contact type sensors. Those contact sensors have a mechanical device which moves electrical potentiometers. There are serious disadvantages to these contact type sensors. First, these devices are delicate and are easily damaged; second, these devices are subject to wear and must be frequently repaired. Furthermore, the actual position of the probe is critical to obtaining proper servo operation. If the probe angle of the sensor is not properly maintained, the servos are not properly responsive and proper action is inhibited, if not entirely prevented. The presence of foreign material on the weld surfaces may also seriously affect the operation of the contact type sensors. Such foreign material can include flux, which can contain fairly large granules of material.

A second group of tracking devices includes those devices using compressed air. These devices require standoff distances which are maintained to extremely close tolerances. Thus, a step change in material surface structures, such as a shoulder, or the like, is likely to cause a collision between the sensor and the material before that sensor can cause a change in position of the device. Such crashes can damage or destroy delicate instruments, necessitating expensive repairs and downtime. The compressed air used in these devices must be extremely clean, that is, entirely free of debris, such as dust, or the like. The cleanliness requirements are so strict as to require white room type conditions. Such specialized equipment is obviously expensive. It is also noted that a light granular flux cannot be used with sensors utilizing compressed air. The compressed air will blow the flux around, thereby causing difficulties. Furthermore, the presence of an air flow can distort the arc or the shielding gas on a gas arc.

Both types of known sensors are sensitive to electrical noise and any splattering caused by the welding operation. The adjustment of the standoff distance of known sensors is also quite difficult.

SUMMARY OF THE INVENTION

The device of the present invention is easily adjusted to accommodate a wide variety of workpieces and is not subject to the drawbacks of prior art sensors.

The unit embodying the teachings of the present invention includes a torch mounting device having electric cylinders to cause the torch to move with respect to a workpiece.

The unit includes non-contact sensors, that is, sensors which do not contact the workpiece, which sense the distance between the sensor and the material being welded. The sensors operate based on the electrical conductivity of the workpiece material, and accordingly, the present unit can be used in conjunction with any electrically conductive material. Each of the sensors generates a signal which is fed to a regulator system which includes a servo amplifier. Position of the welding head is controlled via the servo amplifier.

The unit preferably includes two sensors, one for the horizontal torch head orientation with respect to a weld line, and one for the vertical torch head orientation with respect to the weld line.

It is noted that welding is only a preferred operation, and other operations, such as brazing, or the like, can also be performed without departing from the scope of the present invention.

The unit of the present disclosure includes mechanical means for adjusting the sensors in situ to set a proper standoff distance. The standoff distance is set according to the electrical characteristics of the workpieces and the current used. The sensors are adjusted for a standoff distance which is most suitable for the particular workpieces, and adjustment is very easy and quite accurate.

The sensing units of the presently disclosed unit have many advantages over known devices. For example, the torch is maintained in a proper position with respect to the weld line and is securely held in that position. A better weld is effected more rapidly than is possible with known devices. Due to the very accurate positioning of the torch head, higher welding speeds can be effected.

The unit of the present invention is not adversely affected by foreign material on the workpieces, especially if that foreign material is not electrically conductive. Such material can seriously affect the operation of known devices.

The unit of the present invention is non-critical to electrical noise in the servo loops. Because the sensing unit of the present invention represents a relatively low impedance signal to the servo amplifier, that signal and amplifier are not disturbed by electrical noise generated by the welding arc. In fact, the unit embodying the teachings of the present invention does not even need shielded cable on the signal sensing devices.

The following is a list of further advantages of the presently disclosed unit over known units. The present unit: has fewer moving parts; is compact and lightweight; is readily accessible for maintenance and adjustment; has replacement parts which can be basic shelf items with fast delivery time; is readily adjustable to various configurations through various mounting brackets; has a simple installation; has infinite accuracy with adjustable response speed; has a compact operator console and an electronic control box; requires only minimum operator training; requires only low cost operating power; has a low purchase price; requires no special wiring; and has automatic limit control.

OBJECTS OF THE INVENTION

It is, therefore, a main object of the present invention to maintain the position of a welding device with respect to a workpiece using a non-contact sensor which utilizes the electrical conductivity of the workpiece to generate a proximity signal.

Another object of the present invention is to maintain position of a welding device with respect to a workpiece using an inexpensive non-contact sensor.

A further object of the present invention is to maintain position of a welding device with respect to a workpiece using an easily adjusted non-contact sensor.

It is yet a further object of the present invention to maintain the position of a welding device with respect to a workpiece using a non-contact sensor which can use a standoff distance large enough to maintain the proximity sensor relatively free from damage through collision with the workpiece.

It is still another object of the present invention to maintain position of a welding device with respect to a workpiece using a non-contact sensor which is not affected by non-conductive materials on the workpiece.

It is still a further object of the present invention to maintain position of a welding device with respect to a workpiece using a non-contact sensor which is amenable to use with a wide variety of electrically conductive materials.

These together with other objects and advantages which will become subsequently apparent reside in the details of construction and operation as more fully hereinafter described and claimed, reference being had to the accompanying drawings forming part hereof, wherein like reference numerals refer to like parts throughout.

DETAILED DESCRIPTION OF THE INVENTION

Figure 1:
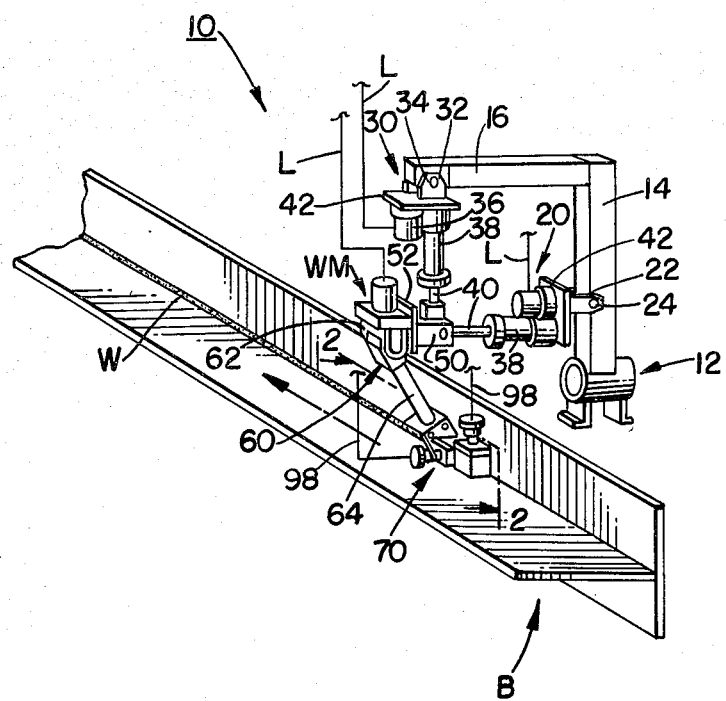
FIG. 1 is a perspective view of a welding unit embodying the teachings of the present invention.
Figure 2:
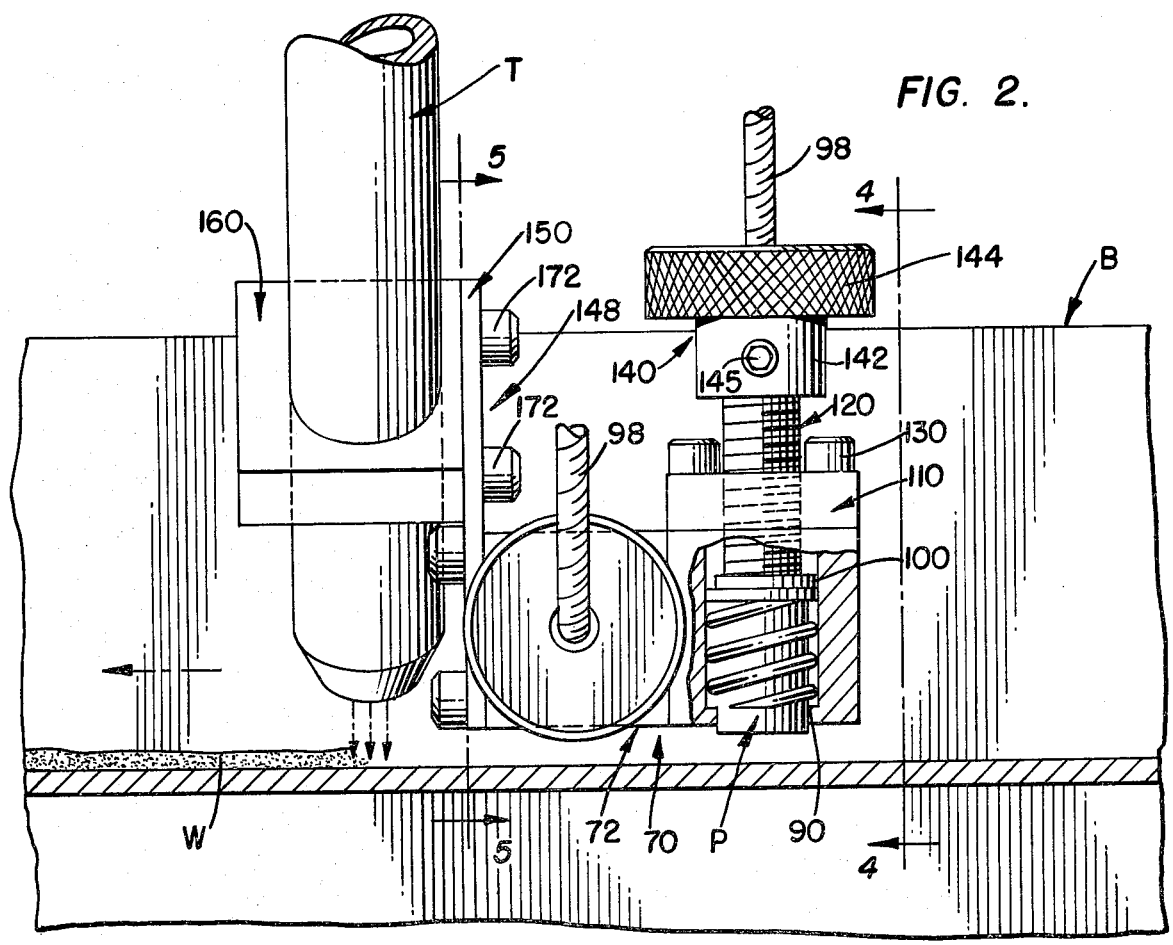
FIG. 2 is a view along line 2—2 of FIG. 1.
Figure 3:
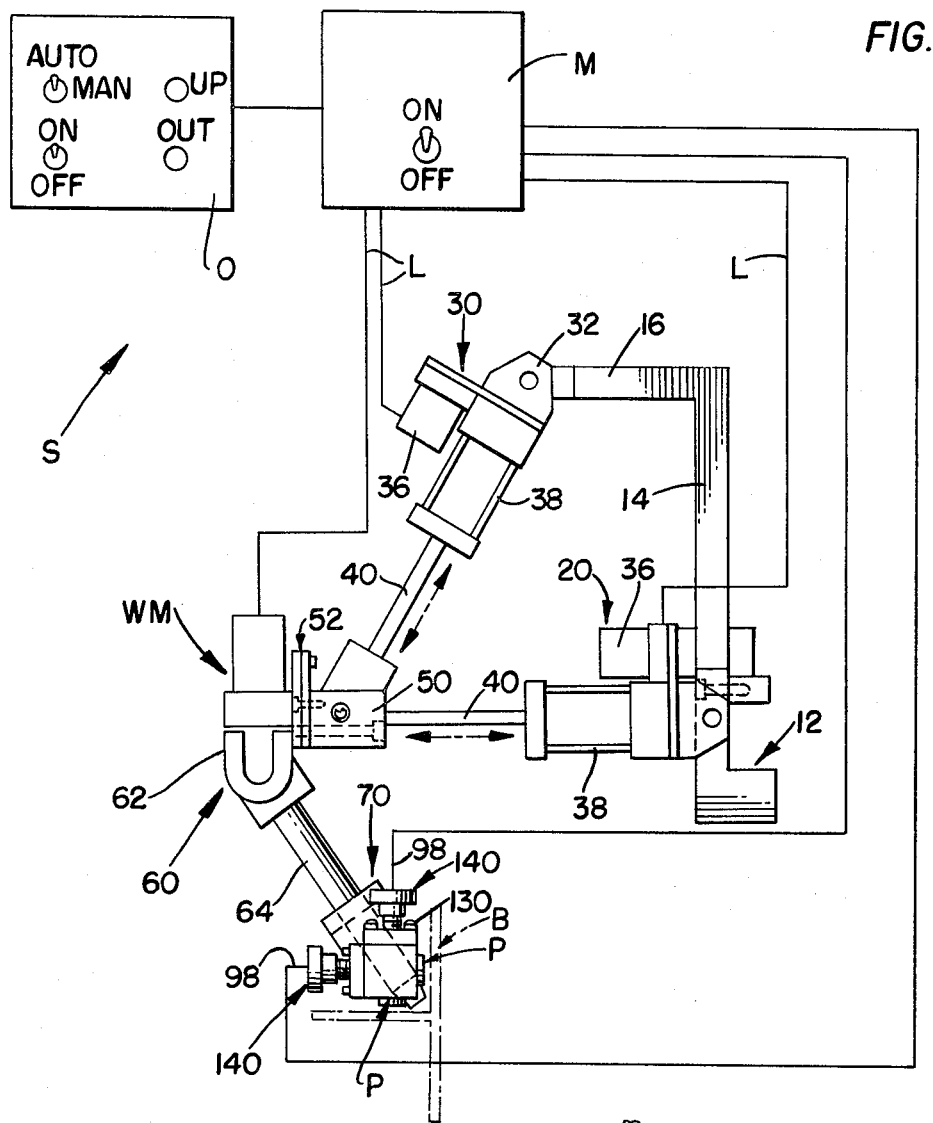
FIG. 3 is a schematic of the feedback loop of the welding unit embodying the teachings of the present invention.

Shown in FIGS. 1–3 is a welding unit 10 which positions a welding torch T adjacent a workpiece to be welded, such as a beam B. A welding wire is fed by a wire feed motor WM and a weld W is formed on the beam.

Unit 10 includes a slide mount 12 positioned on an appropriate mounting means. A mounting standard 14 is fixed in a lower end thereof to the mount 12, and an extension 16 is affixed, as by bolting or the like, to the upper end of the standard 14.

A first electric cylinder assembly 20 is attached to the standard 14 near the lower end thereof by a pair of brackets including bracket 22 which is pivotally connected to the standard by a pivot pin 24. A second electric cylinder assembly 30 is attached to the arm 16 at one end thereof by a pair of brackets 32 connected to the arm 16 by a pivot pin 34. Each of the electric cylinder assemblies includes an electric motor 36 and a cylinder 38 having a piston rod 40 extending outwardly therefrom. The motor causes the piston rod to move inwardly and outwardly of the cylinder. As shown in FIG. 3, the motors 36 are controlled via a regulator system S, which includes an operational control means O and a master control means M which control the application of power to the motors and otherwise control movement of the motors 36 via leads L. The assemblies are mounted on mounting plates 42 which are affixed via the brackets to the standard 14, and the arm 16, respectively. A preferred form of the electric cylinder assembly is manufactured by Industrial Devices Corporation of San Rafael, Calif.

The piston rods 40 are each attached to a head support block 50 which is affixed to a mounting plate 52. As shown in FIG. 1, the first assembly 20 functions as a horizontal position adjuster, and the second assembly 30 functions as a vertical position adjuster. Thus, operation of the first assembly moves the mounting plate horizontally with respect to the workpiece as shown in FIG. 1, and operation of the second assembly moves the mounting plate vertically with respect to the workpiece shown in FIG. 1. The wire feed motor is mounted on the mounting plate 52.

A torch mounting unit 60 is mounted on the mounting plate 52 and includes a base block 62 to which one end of a mounting arm 64 is pivotally attached. A torch and proximity sensor positioning unit 70 is affixed at the other end of the mounting arm 64 and maintains the torch T in the desired orientation with respect to the workpiece.

Figure 4:
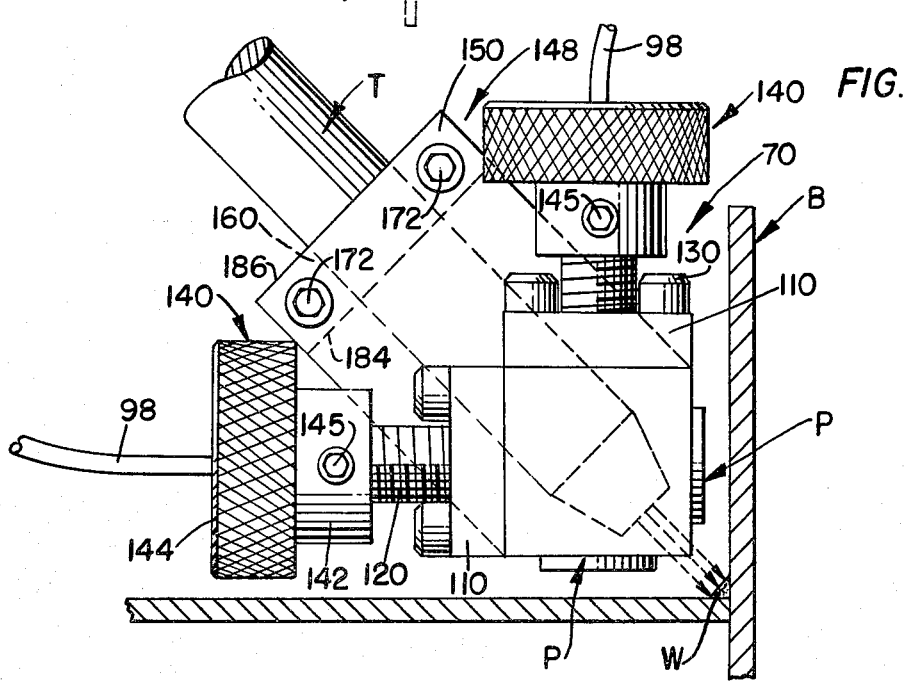
FIG. 4 is a view along line 4—4 of FIG. 2.
Figure 5:
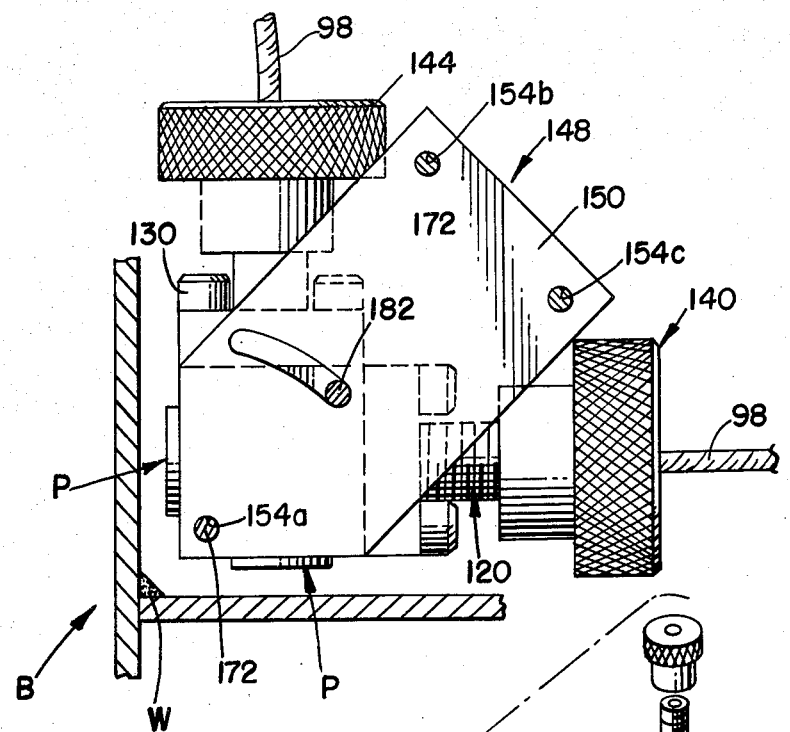
FIG. 5 is a view along line 5—5 of FIG. 2.
Figure 6:
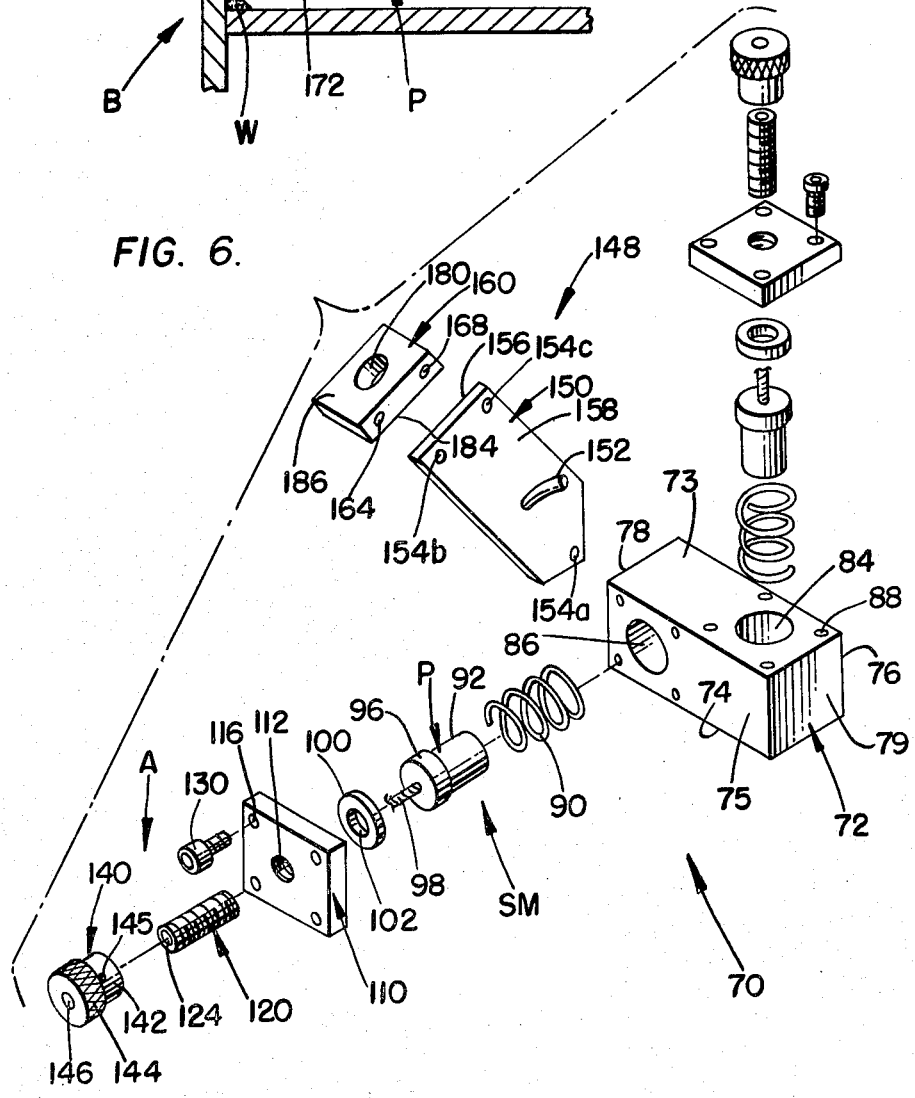
FIG. 6 is an exploded perspective view of a torch and proximity sensor mounting device for use in a unit embodying the teachings of the present invention.

A preferred form of the positioning unit 70 is best shown in FIGS. 4–6, and attention is now directed thereto. As best shown in FIG. 6, the unit 70 includes a rectangular base block 72 having a top face 73, a bottom face 74, side faces 75 and 76, and a pair of ends 78 and 79. A pair of cylindrical bores 84 and 86 are defined in block 72 to extend from faces 73 and 75, respectively, and to have the longitudinal centerlines thereof oriented to be perpendicular with respect to each other and to be located adjacent block ends 78 and 79, respectively. A plurality of internally threaded fastener-receiving bores 88 are defined in the block 72 adjacent the bores 84 and 86. The bores 84 and 86 are similar to each other and the elements associated with each bore are similar. Thus, only one bore will be discussed, it being understood, however, that the discussion applies equally to both bores.

As best shown in FIG. 6, a proximity sensor P is mounted on the block 72 by a spring set means SM which includes a helical compression spring 90 accommodated in bore 86, and which surrounds cylindrical body 92 of the proximity sensor P. The proximity sensor P also has a cap 96 thereon, and an electrical lead 98 extends outwardly of the cap 96 and connects the sensor P with the rest of the electrical circuit. The bore 86 has an inner diameter matching the diameter of the cap 96 so the proximity sensor can be received in the bore with the spring 90 biasing the sensor outwardly of the bore. The lower end of the bore (not shown) is sized to seat the spring 90 thereon while permitting a portion of the proximity sensor body to extend outwardly of the bore 72.

The spring set means further includes an annular gasket 100 which is located on top of the cap 96, and opening 102 of the gasket accommodates the electrical lead 98. A hold-down plate 110 is rectangular and has an internally threaded bore 112 defined therein near the center thereof, and has a plurality of fastener receiving holes 116 defined near the corners thereof.

An in situ sensor adjustment means A of the spring set means includes an externally threaded tube-like fitting 120 threadably received in the central bore 112, and the electrical lead 98 is accommodated by central bore 124 defined within the fitting 120. A plurality of threaded fasteners, such as cap screws 130, attach the plate 110 to the block 72 when those fasteners are received in the holes 116 and in the holes 88 which are aligned therewith to retain the proximity sensors within the bore against the bias of the springs. Once the plate 110 is attached to the block 72, the position of the proximity sensor P in the bore 86 can be set in situ by adjusting the takeup of the threaded fitting 120 in the bore 112. The adjustment means A also includes a thumbscrew 140 having a cylindrical body 142 and a knurled cap 144 and has an internal bore which accommodates one end of the threaded fitting 120. Set screws 145 can be used to attach the thumbscrew to the fitting 120. A lead accommodating hole 146 is defined in the cap 144 through which the lead 98 is received.

A swing arm assembly 148 mounts a torch, or the like, and includes a swing arm plate which acts as an adjustable torch mounting plate 150, and is movably or tiltably attached to end face 78 of the block 72. the plate 150 includes an arcuate slot 152 and a proximal fastener receiving holes 154a as well as distal fastener receiving holes 154b and 154c, all of which are defined in the plate 150. The plate 150 has a pair of faces 156 and 158, and a rectangular torch mounting collar 160 is attached along one side edge thereof to face 156 of the plate 150. A pair of fastener receiving holes 164 and 168 are defined in the collar edge to be aligned with distal holes 154b and 154c of the plate 150. The holes 164 and 168 are internally threaded, and fasteners 172, such as cap screws, or the like, can be used to attach the collar 160 to the plate 150. A torch receiving bore 180 is defined centrally of the collar 160, and has the longitudinal axis thereof essentially perpendicular to the faces 184 and 186 of the collar. The welding torch T is shown as being accommodated in the bore 180, and the plate 150 is pivotally and tiltably attached to the block 72 via proximal hole 154a. A pin 182 is received in the slot to control movement of the plate 150 of the block 72. As can be seen in FIGS. 4 and 6, the torch mounting plate and collar mount the torch T in a plane which is essentially parallel to a plane containing the proximity sensors.

An assembled mount is shown in FIG. 4 and the torch axis is seen to be perpendicular to the faces 184 and 186 of the collar. The torch can be oriented in any desirable location within the collar to effect weld W as indicated in FIG. 4. The angular orientation of the torch is adjusted by pivoting the plate 150 about pin 172. As will be discussed below, the spacing between the torch and the workpiece is controlled by the proximity sensors via the master control and the electric cylinder assemblies.

In operation of the unit, an operator adjusts the thumbscrews to set a standoff distance appropriate to the particular material of the workpiece. During operation, a linear signal is fed by the proximity sensors back to a servo-amplifier which controls the positioning of the welding head. As above-discussed, two channels are used, one for a horizontal axis, and one for a vertical axis. However, other channels can be used without departing from the scope of the present disclosure.

It is noted that once set, the standoff distance is maintained quite accurately, and thus the torch is kept in alignment with the joint being welded in a very precise manner.

It is also noted that the only requirement of the workpiece is that such workpiece be electrically conductive. Thus, any electrically conductive material can be welded using the unit disclosed herein. Such materials as aluminum, bronze, steel, copper, or the like can be welded. In fact, the welding torch can be replaced by a brazing torch, and exotic metals such as titanium, or the like, can be handled. The only differences among the materials is the standoff distance, which, as above-discussed, is easily set by adjustment of the thumbscrews.

In use, the unit embodying the teachings of the present disclosure can use a standoff distance of at least approximately millimeters, as opposed to standoff distances of a few thousandths of an inch in known non-contact proximity sensor units. In fact, standoff distances of as much as 1½ inches can be used with the unit herein disclosed.

The mounting means for both the torch and the standard 14 as well as the joint 50 can be altered to fit various situations. Thus, the unit 10 is quite versatile.

It is also noted that the unit 10 is amenable to a wide variety of workpiece feed rates and response times via simple adjustments to the regulator system S. Thus, the unit is versatile and is quite adaptable to a wide variety of situations.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

We claim:

1. A non-contact proximity sensor unit for positioning a welding torch or the like at a desired standoff distance from electrically conductive workpieces, the proximity sensor unit comprising:

a pair of non-contact proximity sensors for sensing the proximity of a workpiece, said proximity sensors having means for generating a signal based on the electrical conductivity of a workpiece, one sensor of said pair of sensors generating a signal in accordance with the vertical distance between said one sensor and a workpiece, and the other sensor of said pair of sensors generating a signal in accordance with the horizontal distance between said another sensor and a workpiece;

proximity sensor mounting means for mounting said proximity sensors adjacent a workpiece, said proximity sensor mounting means including a spring located in each of a pair of mounting bores and biasing each of said proximity sensors outwardly of said proximity sensor mounting bores, a pair of hold-down plates mounted on said mounting block, each plate covering a proximity sensor receiving bore to hold said spring biased proximity sensor in said bore, each plate having a threaded bore defined therein, a proximity sensor position adjusting threaded tube threadably mounted in each hold-down plate threaded bore to have one end thereof contacting the proximity sensor located within the mounting block proximity sensor receiving bore covered by the hold-down plate and another end thereof extending outwardly of said threaded bore, a thumbscrew mounted on each threaded tube at said another ends thereof for moving said threaded tubes into and out of said proximity sensor receiving bores via said hold-down plate threaded bores so that the proximity sensor mounted in said proximity sensor receiving bore is moved inwardly and outwardly of said proximity sensor receiving bore against the bias of said spring because of the contact between said threaded tube one end and said proximity sensor so that position of said proximity sensors with respect to a workpiece can be adjusted in situ;

electrical control means connected to said proximity sensors to receive a signal generated by said proximity sensors, said electrical control means including an output signal generating means for generating a control signal in accordance with a signal received from said proximity sensors;

torch mounting means for movably mounting a welding torch or the like, said torch mounting means including a mounting plate pivotally attached to said proximity sensor mounting block, said torch mounting means including a pivot pin pivotally mounting said mounting plate to said proximity sensor mounting block, said mounting plate having an arcuate slot defined therein, a pin affixed to said proximity sensor mounting block and received in said arcuate slot for controlling movement of said mounting plate, and a torch collar attached to said mounting plate and mounting a torch in a plane which is essentially parallel to a plane containing said proximity sensors;

torch position control means connected to said electrical control means to receive said output signal therefrom, said torch position control means being connected to said torch mounting means to control position of said torch mounting means with respect to a workpiece in accordance with said output signal received from said electrical control means so that position of a welding torch or the like with respect to a workpiece is maintained and controlled via said non-contact proximity sensors based on the electrical conductivity of such workpiece.

2. The non-contact proximity sensor unit of claim 1 wherein said torch position control means includes an electric motor and a cylinder operated by said electric motor.

3. The non-contact proximity sensor unit of claim 1 wherein the standoff distance is at least approximately ten millimeters.

4. The non-contact proximity sensor unit of claim 1 wherein the standoff distance is approximately 1½ inches.

* * * * *